United States Patent
Bao et al.

(10) Patent No.: US 11,743,889 B2
(45) Date of Patent: Aug. 29, 2023

(54) CHANNEL STATE INFORMATION (CSI) REFERENCE SIGNAL (RS) CONFIGURATION WITH CROSS-COMPONENT CARRIER CSI PREDICTION ALGORITHM

(71) Applicant: QUALCOMM Incorporated, San Diego, CA (US)

(72) Inventors: Jingchao Bao, San Diego, CA (US); Sony Akkarakaran, Poway, CA (US); Tao Luo, San Diego, CA (US); Hamed Pezeshki, San Diego, CA (US); Taesang Yoo, San Diego, CA (US); Arumugam Chendamarai Kannan, San Diego, CA (US); Mahmoud Taherzadeh Boroujeni, San Diego, CA (US); Ajay Gupta, San Diego, CA (US); Vinod Viswanatha Menon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 17/159,020

(22) Filed: Jan. 26, 2021

(65) Prior Publication Data
US 2021/0258991 A1 Aug. 19, 2021

Related U.S. Application Data

(60) Provisional application No. 62/977,064, filed on Feb. 14, 2020.

(51) Int. Cl.
*H04L 25/02* (2006.01)
*H04W 72/1268* (2023.01)

(52) U.S. Cl.
CPC .............. *H04W 72/1268* (2013.01)

(58) Field of Classification Search
None
See application file for complete search history.

(56) References Cited

U.S. PATENT DOCUMENTS

| 9,509,455 B2 | 11/2016 | Annavajjala | |
|---|---|---|---|
| 2015/0003407 A1* | 1/2015 | Seo | H04W 24/00 370/330 |

(Continued)

OTHER PUBLICATIONS

Zimaglia, "Deep Learning Application to 5G Physical Layer for Channel Estimation and CSI Feedback Improvement", Master's Thesis, Academic Year 2018-2019 (Year: 2019).*

(Continued)

*Primary Examiner* — Ajit Patel
*Assistant Examiner* — Liem H. Nguyen
(74) *Attorney, Agent, or Firm* — Loza & Loza LLP

(57) ABSTRACT

Aspects of the disclosure relate to determining channel state information (CSI) on a component carrier. In an example operation, a device determines a mapping between first time-frequency resources corresponding to a first component carrier (CC) and second time-frequency resources corresponding to a second CC using a prediction algorithm. The device receives, from a base station, a channel state information reference signal (CSI-RS) on the first time-frequency resources corresponding to the first CC and measures first CSI on the first time-frequency resources corresponding to the first CC based on the received CSI-RS. The device further predicts second CSI on the second time-frequency resources corresponding to the second CC based on the measured first CSI using the prediction algorithm. The device then generates a CSI report based on the predicted second CSI and sends the CSI report to the base station.

30 Claims, 11 Drawing Sheets

(56) References Cited

U.S. PATENT DOCUMENTS

| | | | | |
|---|---|---|---|---|
| 2015/0063287 | A1* | 3/2015 | Mazzarese | H04W 24/10 370/329 |
| 2015/0312008 | A1* | 10/2015 | Annavajjala | H04L 1/206 370/252 |
| 2016/0150509 | A1* | 5/2016 | You | H04W 72/23 370/329 |
| 2017/0373743 | A1* | 12/2017 | Park | H04L 25/0204 |
| 2019/0173652 | A1* | 6/2019 | Feh | H04L 27/0014 |
| 2019/0357292 | A1* | 11/2019 | Cirik | H04W 24/08 |
| 2020/0036424 | A1* | 1/2020 | Kang | H04B 7/0626 |
| 2020/0169364 | A1* | 5/2020 | Hao | H04W 24/10 |
| 2020/0259545 | A1* | 8/2020 | Bai | H04B 7/0695 |
| 2020/0359362 | A1* | 11/2020 | Yl | H04W 72/1289 |
| 2021/0167920 | A1* | 6/2021 | Cha | H04L 5/0048 |
| 2021/0351885 | A1* | 11/2021 | Chavva | G06N 3/04 |
| 2022/0286882 | A1* | 9/2022 | Laghate | H04W 24/08 |
| 2022/0386292 | A1* | 12/2022 | Hajri | H04B 7/0626 |

OTHER PUBLICATIONS

"3rd Generation Partnership project, Technical Specification Group Radio Access NetworK, NR, NR and NG-RAN Overall Description, Stage 2 (Release 16)", 3GPP Standard, Technical Specification, 3GPP TS 38.300, 3rd Generatior Partnership Project (3GPP), Mobile Competence Centre, 650, Route Des Ludoles, F-06921 Sophia-Antipolis Cedex, France, vol. RAN WG2, No. V16.0.0, Jan. 8, 2020 (Jan. 8, 2020), pp. 1-101, XP051860596, Retrieved from the internet: URL: ftp://ftp.3gpp.org/Specs/archive/38_series/38.300/ 38300-g00-zip. 38300-g00.docx. [retrieved on Jan. 8, 2020] Section 5.4.

International Search Report and Written Opinion—PCT/US2021/ 015293—ISA/EPO—dated Apr. 21, 2021.

* cited by examiner

CHANNEL STATE INFORMATION (CSI) REFERENCE SIGNAL (RS) CONFIGURATION WITH CROSS-COMPONENT CARRIER CSI PREDICTION ALGORITHM

CROSS-REFERENCE TO RELATED APPLICATIONS

This application claims priority to and the benefit of U.S. Provisional Application Ser. No. 62/977,064 entitled "CSI-RS CONFIGURATION WITH CROSS-COMPONENT CARRIER CHANNEL STATE INFORMATION PREDICTION ALGORITHM" filed on Feb. 14, 2020, the entire contents of said application are incorporated herein by reference as if fully set forth below in its entirety and for all applicable purposes.

TECHNICAL FIELD

The technology discussed below relates generally to wireless communication systems, and more particularly, to predicting channel state information on a component carrier at a device without receiving a channel-state information reference signal (CSI-RS) on the component carrier.

INTRODUCTION

Carrier aggregation is a technique used in wireless communication to increase a data rate per user, whereby multiple frequency blocks, referred to as component carriers (CCs) are assigned to the same user. A maximum possible data rate per user is increased the more component carriers are assigned to a user. A sum data rate of a cell is also increased because of better resource utilization. Three types of carrier aggregation are possible depending on the positions of the component carriers in a spectrum. A first type is referred to as intra-band contiguous carrier aggregation where the component carriers are contiguous in the same frequency band. A second type is referred to as intra-band non-contiguous carrier aggregation where the component carriers are in the same frequency band but are separated by a gap. A third type is referred to as inter-band carrier aggregation (applied to heterogeneous networks) where the component carriers lie in different frequency bands.

Channel state information reference signals (CSI-RS) transmitted by a gNB are received by a user equipment (UE) to estimate/measure a channel and report channel quality information (channel state information) back to the gNB. In general, CSI-RS are transmitted on all component carriers assigned to the UE so that the UE can measure the channel state information on each assigned component carrier. Hence, a total number of transmitted CSI-RS may depend on a total number of component carriers assigned to the UE. To increase system efficiency, it may be beneficial to reduce the number of CSI-RS transmitted on the component carriers. Accordingly, aspects of the present disclosure relate to a scheme for predicting channel state information of a component carrier without transmitting/receiving CSI-RS on such component carrier so that CSI-RS overhead may be reduced.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to a method for determining channel state information on a component carrier at a device. The method includes determining a mapping between first time-frequency resources corresponding to a first component carrier and second time-frequency resources corresponding to a second component carrier using a prediction algorithm, receiving, from a base station, a channel state information reference signal (CSI-RS) on the first time-frequency resources corresponding to the first component carrier, measuring first channel state information (CSI) on the first time-frequency resources corresponding to the first component carrier based on the received CSI-RS, predicting second CSI on the second time-frequency resources corresponding to the second component carrier based on the measured first CSI using the prediction algorithm, generating a CSI report based on the predicted second CSI, and sending the CSI report to the base station.

In another example, a device for determining channel state information on a component carrier is disclosed. The device includes at least one processor, a transceiver communicatively coupled to the at least one processor, and a memory communicatively coupled to the at least one processor. The at least one processor is configured to determine a mapping between first time-frequency resources corresponding to a first component carrier and second time-frequency resources corresponding to a second component carrier using a prediction algorithm, receive, from a base station, a channel state information reference signal (CSI-RS) on the first time-frequency resources corresponding to the first component carrier, measure first channel state information (CSI) on the first time-frequency resources corresponding to the first component carrier based on the received CSI-RS, predict second CSI on the second time-frequency resources corresponding to the second component carrier based on the measured first CSI using the prediction algorithm, generate a CSI report based on the predicted second CSI, and send the CSI report to the base station.

In a further example, a device for determining channel state information on a component carrier is disclosed. The device includes means for determining a mapping between first time-frequency resources corresponding to a first component carrier and second time-frequency resources corresponding to a second component carrier using a prediction algorithm, means for receiving, from a base station, a channel state information reference signal (CSI-RS) on the first time-frequency resources corresponding to the first component carrier, means for measuring first channel state information (CSI) on the first time-frequency resources corresponding to the first component carrier based on the received CSI-RS, means for predicting second CSI on the second time-frequency resources corresponding to the second component carrier based on the measured first CSI using the prediction algorithm, means for generating a CSI report based on the predicted second CSI, and means for sending the CSI report to the base station.

In another example, a non-transitory computer-readable medium storing computer-executable code at a device for determining channel state information on a component carrier is disclosed. The non-transitory computer-readable medium includes code for causing a computer to determine a mapping between first time-frequency resources corresponding to a first component carrier and second time-frequency resources corresponding to a second component carrier using a prediction algorithm, receive, from a base station, a channel state information reference signal (CSI-RS) on the first time-frequency resources corresponding to the first component carrier, measure first channel state information (CSI) on the first time-frequency resources corresponding to the first component carrier based on the received CSI-RS, predict second CSI on the second time-frequency resources corresponding to the second component carrier based on the measured first CSI using the prediction algorithm, generate a CSI report based on the predicted second CSI, and send the CSI report to the base station.

In one example, a method for receiving channel state information of a component carrier at a base station is disclosed. The method includes determining a mapping between first time-frequency resources corresponding to a first component carrier and second time-frequency resources corresponding to a second component carrier, transmitting, to a device, a channel state information reference signal (CSI-RS) on the first time-frequency resources corresponding to the first component carrier, and receiving, from the device, a channel state information (CSI) report including predicted CSI on the second time-frequency resources corresponding to the second component carrier, the predicted CSI based on the CSI-RS transmitted on the first time-frequency resources corresponding to the first component carrier.

In another example, a base station for receiving channel state information of a component carrier is disclosed. The base station includes at least one processor, a transceiver communicatively coupled to the at least one processor, and a memory communicatively coupled to the at least one processor. The at least one processor is configured to determine a mapping between first time-frequency resources corresponding to a first component carrier and second time-frequency resources corresponding to a second component carrier, transmit, to a device, a channel state information reference signal (CSI-RS) on the first time-frequency resources corresponding to the first component carrier, and receive, from the device, a channel state information (CSI) report including predicted CSI on the second time-frequency resources corresponding to the second component carrier, the predicted CSI based on the CSI-RS transmitted on the first time-frequency resources corresponding to the first component carrier.

In a further example, a base station for receiving channel state information of a component carrier is disclosed. The base station includes means for determining a mapping between first time-frequency resources corresponding to a first component carrier and second time-frequency resources corresponding to a second component carrier, means for transmitting, to a device, a channel state information reference signal (CSI-RS) on the first time-frequency resources corresponding to the first component carrier, and means for receiving, from the device, a channel state information (CSI) report including predicted CSI on the second time-frequency resources corresponding to the second component carrier, the predicted CSI based on the CSI-RS transmitted on the first time-frequency resources corresponding to the first component carrier.

In another example, a non-transitory computer-readable medium storing computer-executable code at a base station for receiving channel state information of a component carrier is disclosed. The non-transitory computer-readable medium includes code for causing a computer to determine a mapping between first time-frequency resources corresponding to a first component carrier and second time-frequency resources corresponding to a second component carrier, transmit, to a device, a channel state information reference signal (CSI-RS) on the first time-frequency resources corresponding to the first component carrier, and receive, from the device, a channel state information (CSI) report including predicted CSI on the second time-frequency resources corresponding to the second component carrier, the predicted CSI based on the CSI-RS transmitted on the first time-frequency resources corresponding to the first component carrier.

These and other aspects of the disclosure will become more fully understood upon a review of the detailed description, which follows. Other aspects and features of the present disclosure will become apparent to those of ordinary skill in the art, upon reviewing the following description of specific, exemplary aspects of the present disclosure in conjunction with the accompanying figures. While features of the present disclosure may be discussed relative to certain aspects and figures below, all aspects of the present disclosure can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip aspects and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
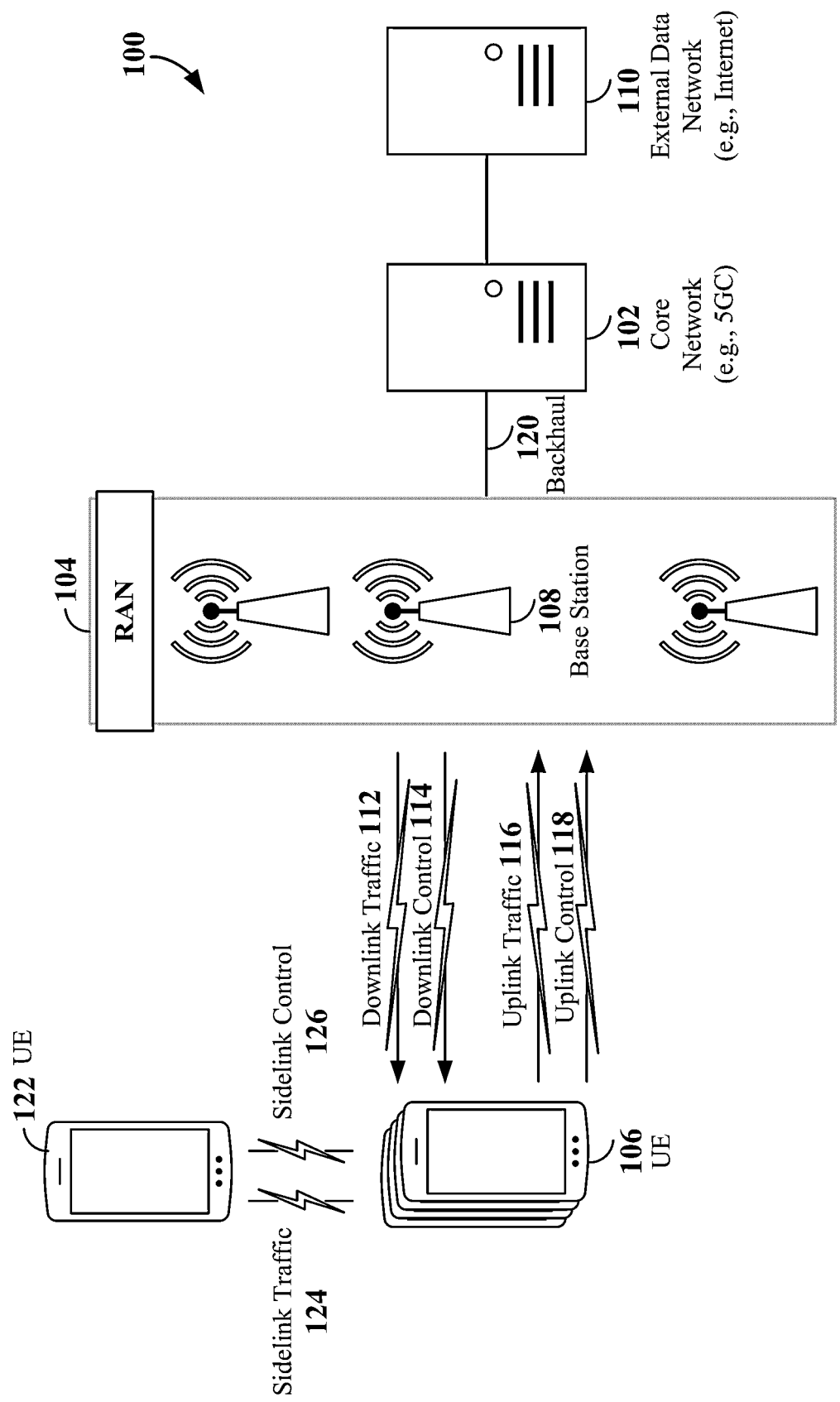
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the base station/scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a base station 108 may broadcast downlink traffic 112 to one or more UEs 106. Broadly, the base station 108 is a node or device responsible for scheduling traffic in a wireless communication network, including the downlink traffic 112 and, in some examples, uplink traffic 116 from one or more UEs 106 to the base station 108. On the other hand, the UE 106 is a node or device that receives downlink control information 114, including but not limited to scheduling information (e.g., a grant), synchronization or timing information, or other control information from another entity in the wireless communication network such as the base station 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
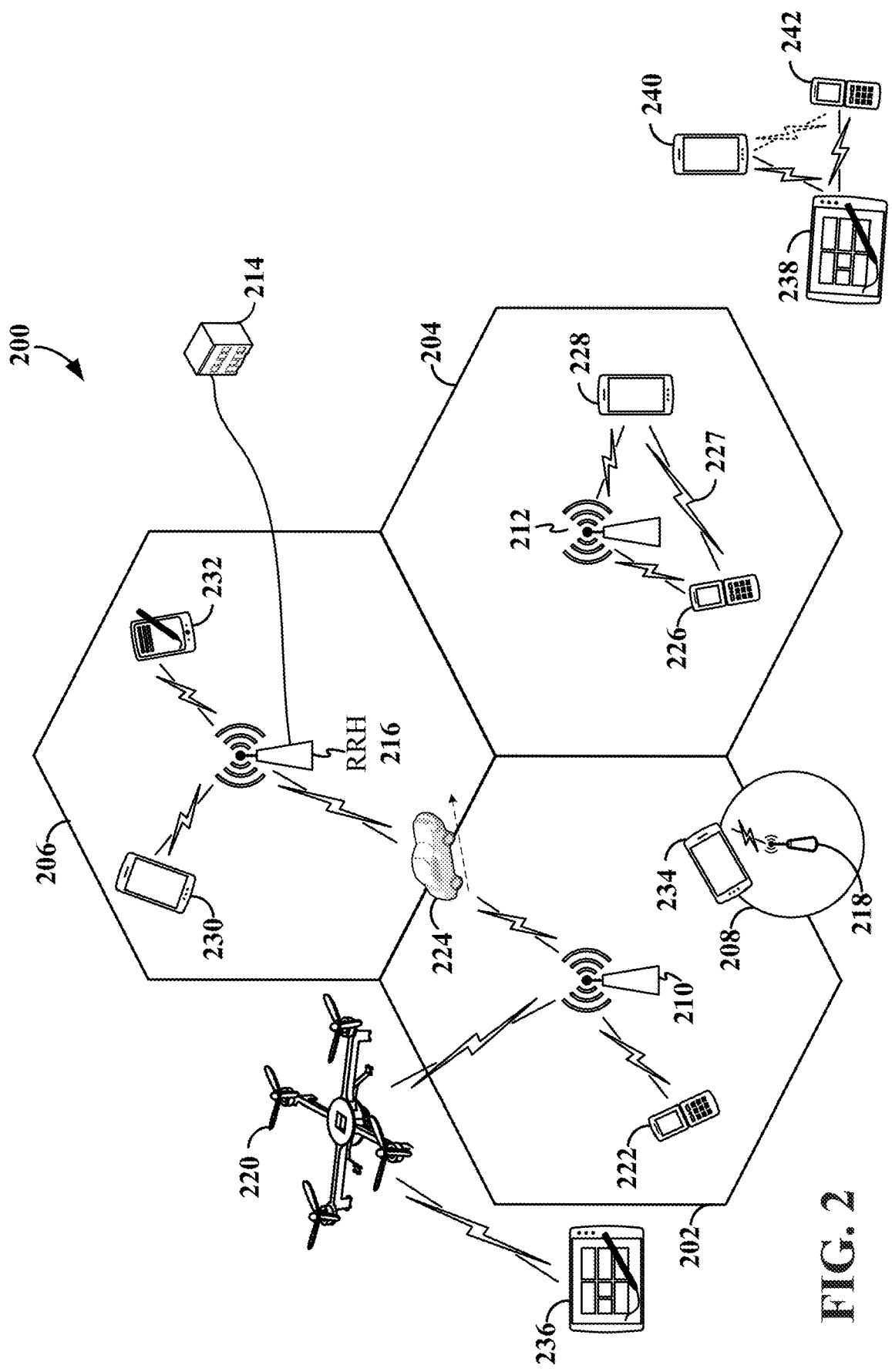
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, scheduled entities such as a first UE 106 and a second UE 122 may utilize sidelink signals for direct D2D communication. Sidelink signals may include sidelink traffic 124 and sidelink control 126. Sidelink control information 126 may in some examples include a request signal, such as a request-to-send (RTS), a source transmit signal (STS), and/or a direction selection signal (DSS). The request signal may provide for a UE 106 to request a duration of time to keep a sidelink channel available for a sidelink signal. Sidelink control information 126 may further include a response signal, such as a clear-to-send (CTS) and/or a destination receive signal (DRS). The response signal may provide for the UE 106 to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information 124.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
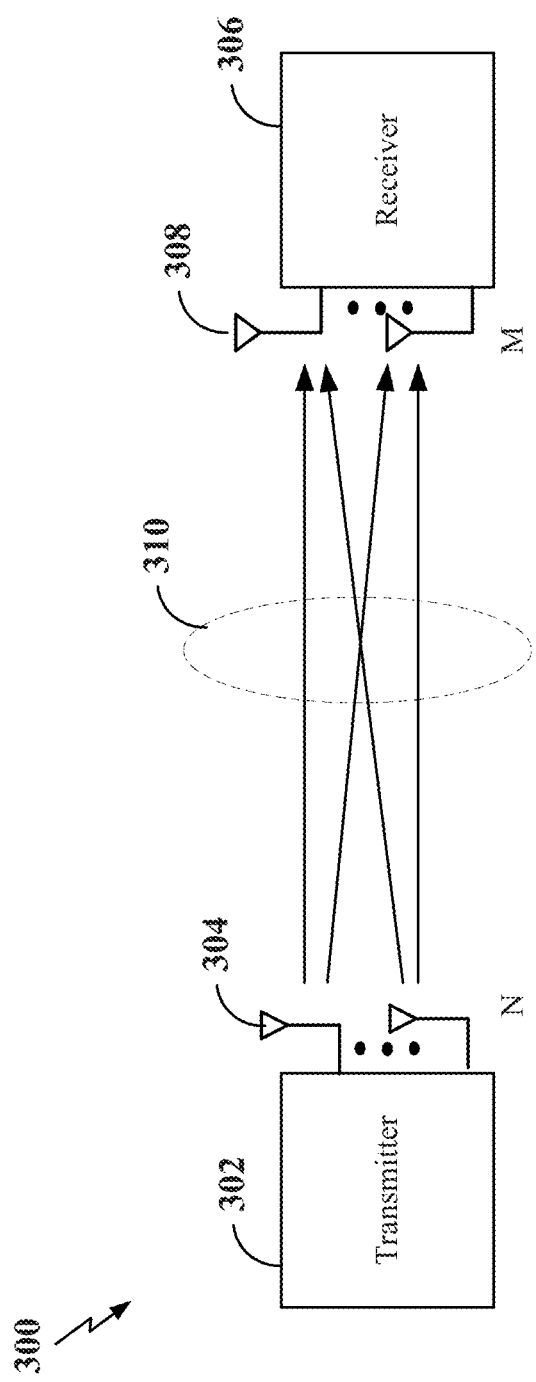
FIG. 3 is a block diagram illustrating a wireless communication system supporting multiple-input multiple-output (MIMO) communication.

In some aspects of the disclosure, the base station/scheduling entity and/or UE/scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a base station/scheduling entity 108, a UE/scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feedback the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of base stations (e.g., scheduling entities) 108 and UEs (e.g., scheduled entities) 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
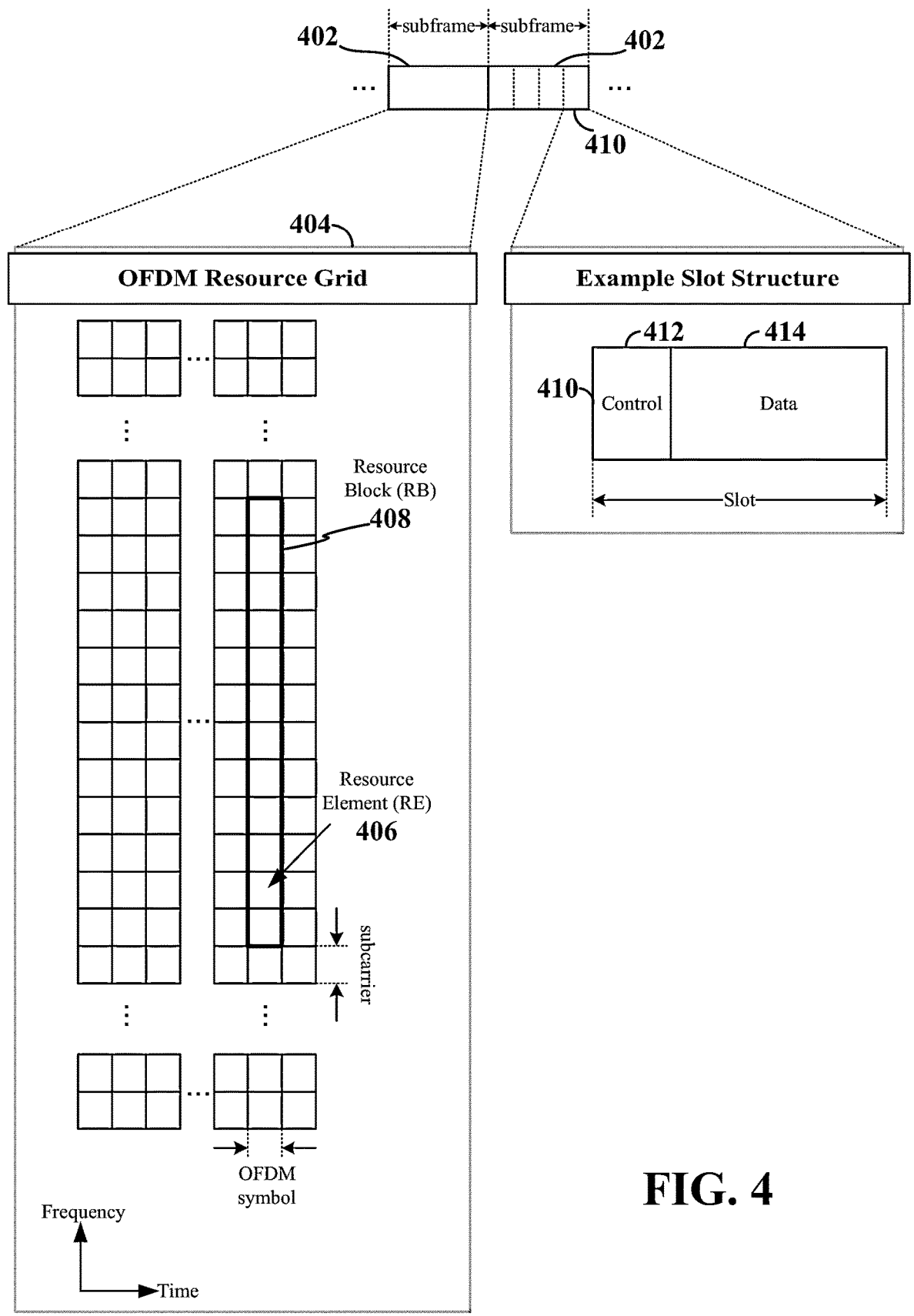
FIG. 4 is a schematic illustration of an organization of wireless resources in an air interface utilizing orthogonal frequency divisional multiplexing (OFDM).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In a DL transmission, the transmitting device (e.g., the base station 108) may allocate one or more REs 406 (e.g., within a control region 412) to carry DL control information 114 including one or more DL control channels that generally carry information originating from higher layers, such as a physical broadcast channel (PBCH), a physical downlink control channel (PDCCH), etc., to one or more UEs 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell, including but not limited to power control commands, scheduling information, a grant, and/or an assignment of REs for DL and UL transmissions.

In an UL transmission, the transmitting device (e.g., the UE 106) may utilize one or more REs 406 to carry UL control information 118 originating from higher layers via one or more UL control channels, such as a physical uplink control channel (PUCCH), a physical random access channel (PRACH), etc., to the base station 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the base station 108 to schedule uplink transmissions. Here, in response to the SR transmitted on the control channel 118, the base station 108 may transmit downlink control information 114 that may schedule resources for uplink packet transmissions. UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand. In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 4 are not necessarily all the channels or carriers that may be utilized between a base station 108 and UEs 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 5:
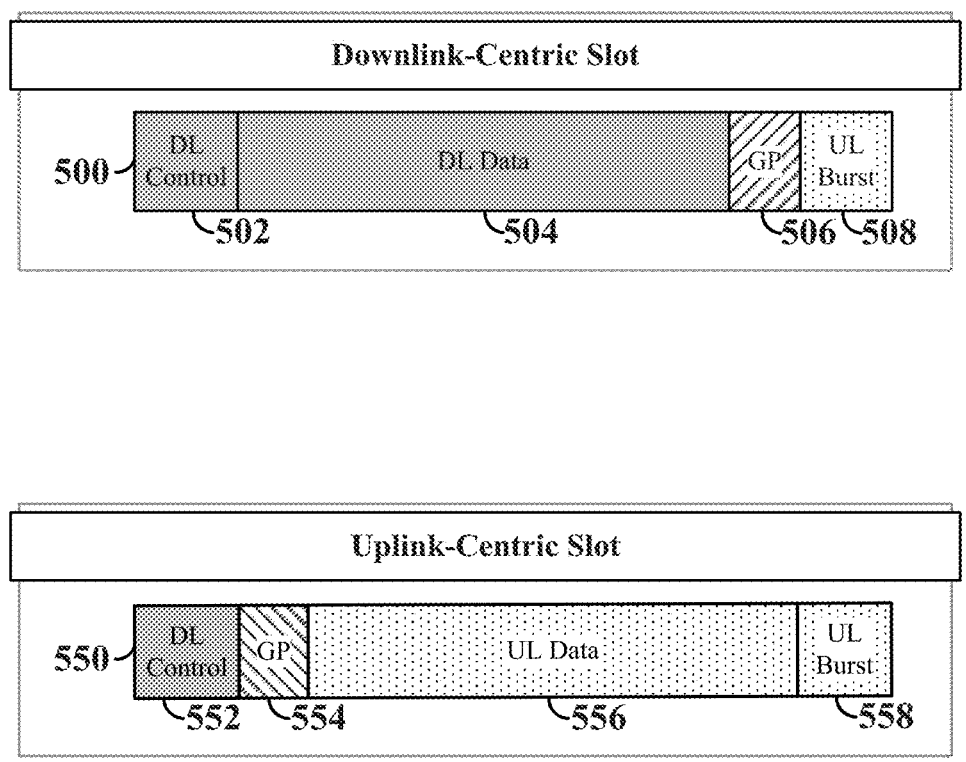
FIG. 5 is a schematic illustration of exemplary self-contained slots according to some aspects of the disclosure.

According to an aspect of the disclosure, one or more slots may be structured as self-contained slots. For example, FIG. 5 illustrates two example structures of self-contained slots 500 and 550. The self-contained slots 500 and/or 550 may be used, in some examples, in place of the slot 410 described above and illustrated in FIG. 4.

In the illustrated example, a DL-centric slot 500 may be a transmitter-scheduled slot. The nomenclature DL-centric generally refers to a structure wherein more resources are allocated for transmissions in the DL direction (e.g., transmissions from the base station 108 to the UE 106). Similarly, an UL-centric slot 550 may be a receiver-scheduled slot, wherein more resources are allocated for transmissions in the UL direction (e.g., transmissions from the UE 106 to the base station 108).

Each slot, such as the self-contained slots 500 and 550, may include transmit (Tx) and receive (Rx) portions. For example, in the DL-centric slot 500, the base station 108 first has an opportunity to transmit control information, e.g., on a PDCCH, in a DL control region 502, and then an opportunity to transmit DL user data or traffic, e.g., on a PDSCH in a DL data region 504. Following a guard period (GP) region 506 having a suitable duration, the base station 108 has an opportunity to receive UL data and/or UL feedback including any UL scheduling requests, CSF, a HARQ ACK/NACK, etc., in an UL burst 508 from other entities using the carrier. Here, a slot such as the DL-centric slot 500 may be referred to as a self-contained slot when all of the data carried in the data region 504 is scheduled in the control region 502 of the same slot; and further, when all of the data carried in the data region 504 is acknowledged (or at least has an opportunity to be acknowledged) in the UL burst 508 of the same slot. In this way, each self-contained slot may be considered a self-contained entity, not necessarily requiring any other slot to complete a scheduling-transmission-acknowledgment cycle for any given packet.

The GP region 506 may be included to accommodate variability in UL and DL timing. For example, latencies due to radio frequency (RF) antenna direction switching (e.g., from DL to UL) and transmission path latencies may cause the UE 106 to transmit early on the UL to match DL timing. Such early transmission may interfere with symbols received from the base station 108. Accordingly, the GP region 506 may allow an amount of time after the DL data region 504 to prevent interference, where the GP region 506 provides an appropriate amount of time for the base station 108 to switch its RF antenna direction, an appropriate amount of time for the over-the-air (OTA) transmission, and an appropriate amount of time for ACK processing by the UE.

Similarly, the UL-centric slot 550 may be configured as a self-contained slot. The UL-centric slot 550 is substantially similar to the DL-centric slot 500, including a guard period 554, an UL data region 556, and an UL burst region 558.

The slot structure illustrated in slots 500 and 550 is merely one example of self-contained slots. Other examples may include a common DL portion at the beginning of every slot, and a common UL portion at the end of every slot, with various differences in the structure of the slot between these respective portions. Other examples still may be provided within the scope of the present disclosure.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Figure 6:
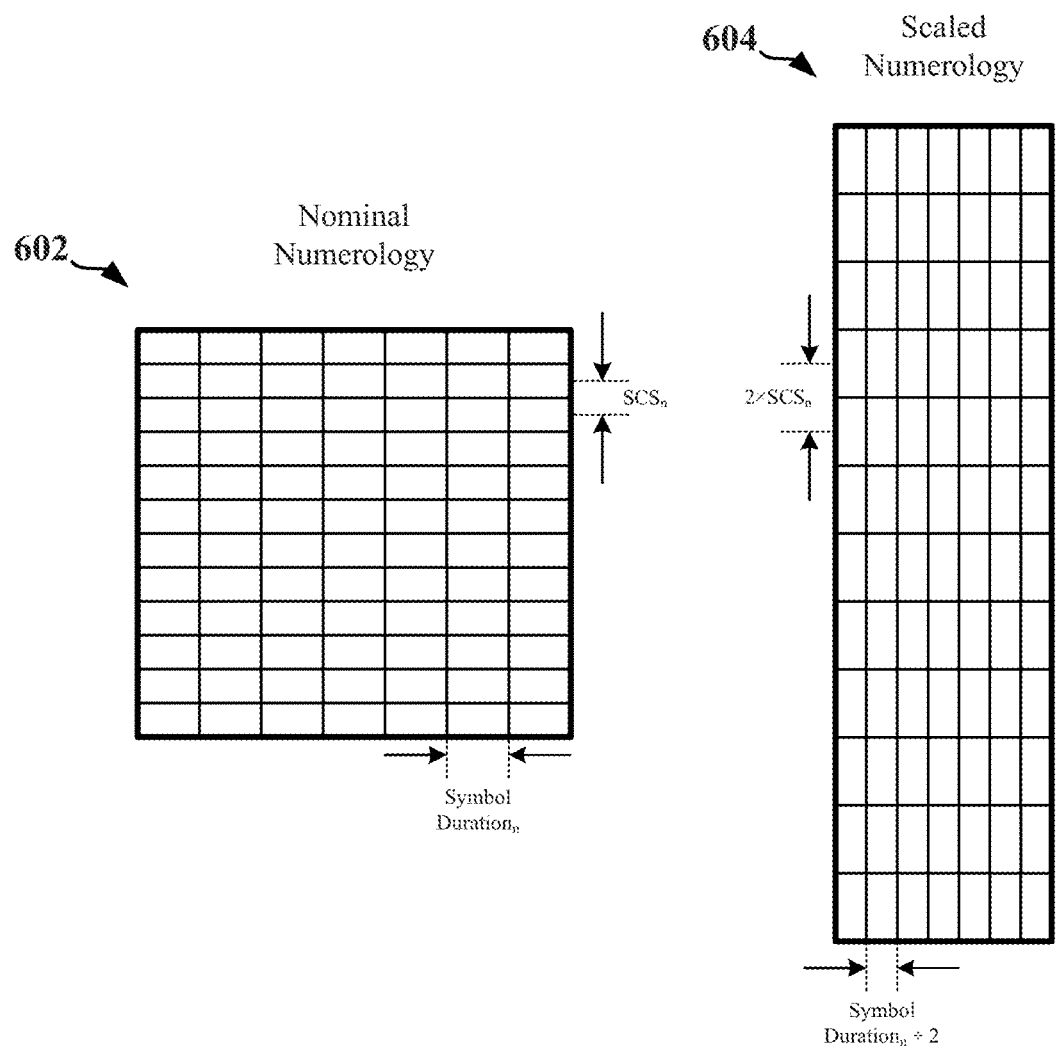
FIG. 6 is a schematic illustration of an OFDM air interface utilizing a scalable numerology according to some aspects of the disclosure.

To illustrate this concept of a scalable numerology, FIG. 6 shows a first RB 602 having a nominal numerology, and a second RB 604 having a scaled numerology. As one example, the first RB 602 may have a 'nominal' subcarrier spacing ($SCS_n$) of 30 kHz, and a 'nominal' symbol duration$_n$ of 333 μs. Here, in the second RB 604, the scaled numerology includes a scaled SCS of double the nominal SCS, or 2×$SCS_n$=60 kHz. Because this provides twice the bandwidth per symbol, it results in a shortened symbol duration to carry the same information. Thus, in the second RB 604, the scaled numerology includes a scaled symbol duration of half the nominal symbol duration, or (symbol duration$_n$)÷2=167 μs.

Carrier aggregation is used in wireless communication to increase a data rate per user, whereby multiple frequency blocks (component carriers or CCs) are assigned to the same UE. A maximum possible data rate per user is increased the more component carriers are assigned to a user. A sum data rate of a cell is also increased because of better resource utilization. Three types of carrier aggregation include: 1) intra-band contiguous carrier aggregation where the component carriers are contiguous in the same frequency band; 2) as intra-band non-contiguous carrier aggregation where the component carriers are in the same frequency band but are separated by a gap; and 3) inter-band carrier aggregation (applied to heterogeneous networks) where the component carriers lie in different frequency bands.

Channel state information reference signals (CSI-RS) in 5G NR are used for downlink channel state information (CSI) estimation. CSI-RS further support reference signal received power (RSRP) measurements for mobility and beam management (including analog beamforming), time/frequency tracking for demodulation, and uplink reciprocity-based precoding. The CSI-RS is UE-specific; nevertheless, multiple users can share the same CSI-RS resource. 5G NR defines zero-power CSI-RS (ZP-CSI-RS) and non-zero-power CSI-RS (NZP-CSI-RS). When a zero-power CSI-RS is configured, no information is transmitted in the resource elements (REs) designated to CSI-RS. Moreover, the REs (designated to CSI-RS) are not used for PDSCH transmission. In this case, the zero-power CSI-RS is used to mask certain REs, making them unavailable for PDSCH mapping/transmission.

Aspects of the present disclosure relate to increasing system efficiency by reducing the number of CSI-RS transmitted on component carriers. In an aspect, a scheme for predicting channel state information of a component carrier is provided such that the transmission/reception of CSI-RS on the component carrier is no longer needed, and therefore, CSI-RS overhead in the component carrier is reduced.

Previous developments have involved using information related to one component carrier to predict information related to another component carrier. For example, measured information corresponding to a first component carrier (e.g., frequency band in frequency range FR1 (450 to 6000 MHz)) may be used to predict information corresponding to a second (cross-component) carrier (e.g., frequency band in frequency range FR2 (24250 to 52600 MHz)). The cross-component carrier and/or the information corresponding to the cross-component carrier may be predicted using a prediction algorithm based on the measured information corresponding to the first component carrier.

In an aspect, use of such prediction algorithm may be extended to reduce the number of CSI-RS transmitted to the UE. For example, based on the prediction algorithm, measured channel state information corresponding to CSI-RS transmitted on a first component carrier (measured CC) may be used to predict channel state information of a second component carrier/cross-component carrier (predicted CC). Thus, instead of sending CSI-RS to all component carriers (e.g., measured CC and predicted CC), CSI-RS may be transmitted to the measured CC only, thus reducing CSI-RS overhead on the predicted CC.

Figure 7:
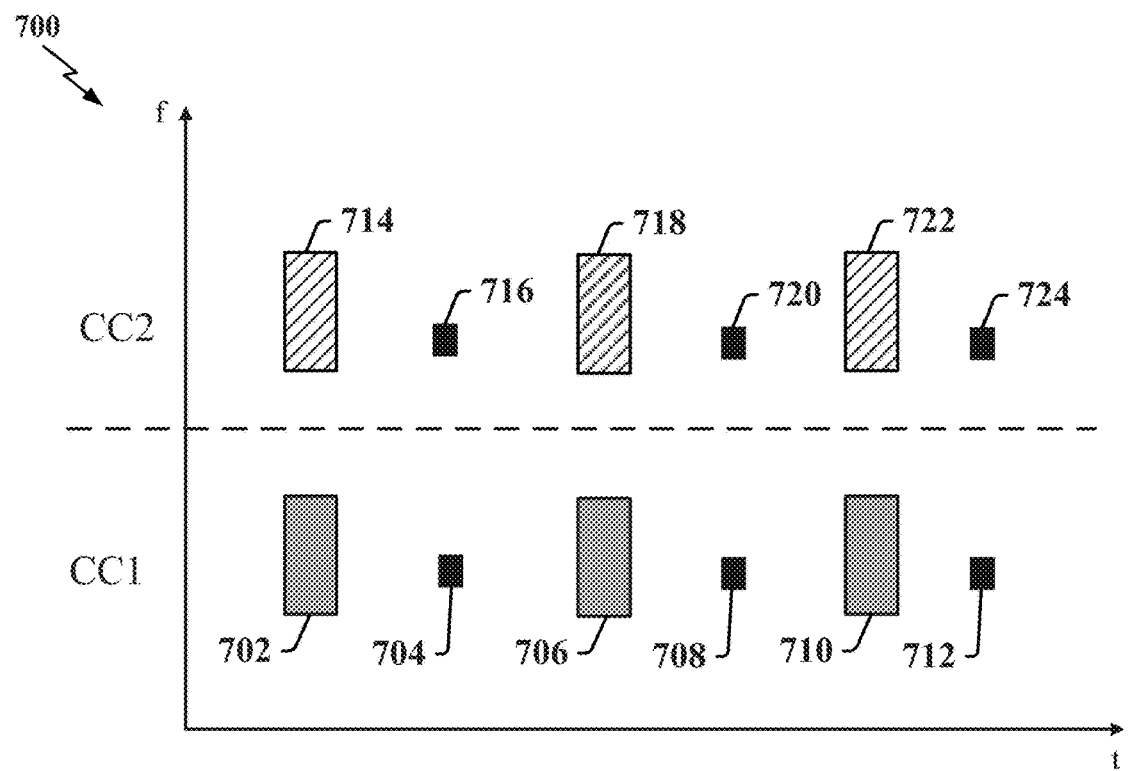
FIG. 7 illustrates examples of CSI-RS scheduling on one or more component carriers according to some aspects of the present disclosure.

FIG. 7 illustrates examples of CSI-RS scheduling on one or more component carriers. CSI-RS are scheduled per bandwidth part (BWP) (or component carrier). CSI-RS-related signaling may occupy time-frequency resources in both a downlink (DL) direction and an uplink (UL) direction. For example, CSI-RS sent from a gNB are transmitted on DL resources and a CSI report sent from a UE are transmitted on UL resources.

Referring to a first example of CSI-RS scheduling 700, a gNB may transmit CSI-RS to a UE on time-frequency resources 702 corresponding to a first component carrier (CC1). Accordingly, the UE may measure channel quality on the first component carrier based on the CSI-RS and generate a CSI report. The UE may transmit the CSI report to the gNB on time-frequency resources 704 corresponding to the first component carrier (CC1). The UE may repeat this process for subsequent CSI-RS received on the first component carrier (CC1). As shown, upon receiving CSI-RS on time-frequency resources 706, the UE may measure channel quality based on the received CSI-RS and send a CSI report on time-frequency resources 708. Moreover, upon receiving CSI-RS on time-frequency resources 710, the UE may measure channel quality based on the received CSI-RS and send a CSI report on time-frequency resources 712.

Still referring to the first example of CSI-RS scheduling 700, the gNB may also transmit CSI-RS to the UE on time-frequency resources 714 corresponding to a second component carrier (CC2). Accordingly, the UE may measure channel quality on the second component carrier based on the CSI-RS and generate a CSI report. The UE may transmit the CSI report to the gNB on time-frequency resources 716 corresponding to the second component carrier (CC2). The UE may repeat this process for subsequent CSI-RS received on the second component carrier (CC2). As shown, upon receiving CSI-RS on time-frequency resources 718, the UE may measure channel quality based on the received CSI-RS and send a CSI report to the gNB on time-frequency resources 720. Moreover, upon receiving CSI-RS on time-frequency resources 722, the UE may measure channel quality based on the received CSI-RS and send a CSI report to the gNB on time-frequency resources 724.

In an aspect, cross-component carrier channel prediction facilitates the prediction of channel state information (CSI) of one or more component carriers (predicted CCs) based on measured channel state information corresponding to CSI-RS transmitted on one or more other component carriers/cross-component carriers (measured CCs).

Referring to a second example of CSI-RS scheduling 750, a gNB may transmit CSI-RS to a UE on time-frequency resources 752 corresponding to a first component carrier (CC1). Accordingly, the UE may measure channel quality/channel state information on CC1 based on the CSI-RS and generate a CSI report corresponding to CC1. The UE may transmit to the gNB the CSI report corresponding to CC1 on time-frequency resources 754 corresponding to CC1. In an aspect, the UE may also predict channel quality/channel state information on time-frequency resources 764 corresponding to a second component carrier (CC2) using the measured channel state information on CC1 (i.e., measured channel state information based on CSI-RS transmitted on time-frequency resources 752). The UE may utilize a prediction algorithm (e.g., machine learning or artificial intelligence algorithm) to predict the channel state information on CC2 based on the measured channel state information on CC1. Thereafter, the UE may generate a predicted CSI report (also referred to as "shadow CSI-report") corresponding to CC2 based on the predicted channel state information on time-frequency resources 764. Finally, the UE may transmit the predicted CSI report to the gNB on time-frequency resources 754 corresponding to CC1, time-frequency resources 766 corresponding to CC2, or both. Accordingly, CSI-RS overhead on CC2 may be reduced since the channel state information on time-frequency resources 764 may be determined without the UE having to receive CSI-RS on time-frequency resources 764.

The UE may repeat this process for subsequent CSI-RS received on CC1. As shown, upon receiving CSI-RS on time-frequency resources 756, the UE may measure channel quality/channel state information on CC1 based on the received CSI-RS and send a CSI report to the gNB corresponding to CC1 on time-frequency resources 758. The UE may further predict (using the prediction algorithm) channel quality/channel state information on time-frequency resources 768 corresponding to CC2 using the measured channel state information on CC1 (i.e., measured channel state information based on CSI-RS transmitted on time-frequency resources 756). Thereafter, the UE may generate a predicted CSI report corresponding to CC2 based on the predicted channel state information on time-frequency resources 768 and transmit the predicted CSI report to the gNB on time-frequency resources 758 corresponding to CC1, time-frequency resources 770 corresponding to CC2, or both. Accordingly, CSI-RS overhead on CC2 may be reduced since the channel state information on time-frequency resources 768 may be determined without the UE having to receive CSI-RS on time-frequency resources 768.

Moreover, upon receiving CSI-RS on time-frequency resources 760, the UE may measure channel quality/channel state information on CC1 based on the received CSI-RS and send a CSI report to the gNB corresponding to CC1 on time-frequency resources 762. The UE may further predict (using the prediction algorithm) channel quality/channel state information on time-frequency resources 772 corresponding to CC2 using the measured channel state information on CC1 (i.e., measured channel state information based on CSI-RS transmitted on time-frequency resources 760). Thereafter, the UE may generate a predicted CSI report corresponding to CC2 based on the predicted channel state information on time-frequency resources 772 and transmit the predicted CSI report to the gNB on time-frequency resources 762 corresponding to CC1, time-frequency resources 774 corresponding to CC2, or both. Accordingly, CSI-RS overhead on CC2 may be reduced since the channel state information on time-frequency resources 772 may be determined without the UE having to receive CSI-RS on time-frequency resources 772.

In an aspect, the predicted (shadow) CSI-report may be transmitted on a periodic, semi-persistent, and/or aperiodic basis. The periodic, semi-persistent, and aperiodic bases for transmission may be enabled via a radio resource control (RRC) configuration message.

In an aspect, CSI reports transmitted by the UE are based on a CSI report configuration, which includes a CSI-RS resource configuration. Thus, if the UE receives a CSI-RS signal in a component carrier, the UE can generate and send a CSI report for the component carrier based on the resource configuration for the received CSI-RS signal. In a further aspect, the CSI report may be configured/generated for a component carrier in which no NZP-CSI-RS is sent, e.g., when the channel state information is predicted for the component carrier. In another aspect, the UE may be informed of whether the UE is to predict the channel state information on a particular component carrier and how a prediction scheme would operate.

In order for a UE to predict the channel state information on a particular component carrier, both the UE and the gNB have to agree on: 1) what component carriers will the channel state information be measured based on CSI-RS (measured CCs); and 2) what component carriers will the channel state information be predicted (predicted CCs). Moreover, a mapping between the measured CCs and the predicted CCs must be known by the UE and the gNB. The mapping between a NZP-CSI-RS (for a measured CC) and a shadow-NZP-CSI-RS (for a predicted CC) may be determined using a prediction algorithm (e.g., machine learning (ML)/artificial intelligence (AI) algorithm). The prediction algorithm may be owned by the UE itself or provided by the gNB to the UE.

If the prediction algorithm is owned by the UE, then the algorithm is local to the UE and the gNB may not be aware of the mapping between the measured CCs and the predicted CCs until the UE reports its capability and the mapping to the gNB. For example, the UE may report its capability and the mapping via a signal in a CSI-related field of an RRC message, or via a prediction model report from the UE to the gNB. Once the gNB is aware of the mapping, the gNB may perform an RRC reconfiguration to reconfigure a CSI-RS resource configuration by removing an NZP-CSI-RS resource configuration of predicted CCs and adding a shadow-NZP-CSI-RS resource configuration. The gNB may also perform the RRC reconfiguration to reconfigure the CSI-RS resource configuration by removing a shadow-NZP-CSI-RS resource configuration of measured CCs and adding a NZP-CSI-RS resource configuration.

If the prediction algorithm is owned by the gNB, then the mapping between the measured CCs and the predicted CCs will already be known to the gNB, and the gNB can initially configure a CSI-RS resource configuration based on the mapping. Hence, the gNB does not need to perform a reconfiguration operation. The gNB may further transmit the prediction algorithm to the UE (e.g., via PDSCH or PDCCH) for implementation at the UE. Notably, the gNB does not need to transmit the mapping to the UE. If the UE is aware of the prediction algorithm, then the UE can determine the mapping itself.

Zero-power CSI-RS (ZP-CSI-RS) and non-zero-power CSI-RS (NZP-CSI-RS) are defined in 5G NR (TS 38.211). For a non-zero-power CSI-RS configured by a NZP-CSI-RS-Resource information element (IE), a reference signal sequence will be generated according to TS 38.211 clause 7.4.1.5.2 and mapped to resource elements according to clause TS 38.211 clause 7.4.1.5.3. For a zero-power CSI-RS configured by a ZP-CSI-RS-Resource information element (IE), the UE will assume that the resource elements defined in TS 38.211 clause 7.4.1.5.3 are not used for PDSCH transmission. The UE performs the same measurement/reception on channels/signals except PDSCH regardless of whether they collide with ZP-CSI-RS or not.

An aspect of the disclosure relates to defining another type of CSI-RS—a shadow-NZP-CSI-RS. For a shadow-non-zero-power CSI-RS configured by a shadow-NZP-CSI-RS-Resource information element (IE), a reference signal sequence will not be generated and mapped to resource elements. Hence, the configured shadow-NZP-CSI-RS is similar to a zero-power-CSI-RS (ZP-CSI-RS) in that the shadow-NZP-CSI-RS serves as a placeholder to indicate to the UE that channel state information will be predicted for the resource element corresponding to the shadow-NZP-CSI-RS. The shadow-NZP-CSI-RS may have the same priority as the NZP-CSI-RS. Moreover, the shadow-NZP-CSI-RS will not collide with any previously configured ZP-CSI-RS. No reference signal (CSI-RS) is actually transmitted on the resource element. Instead, the resource element may be used for other purposes (e.g., a data transmission on PDSCH, or for transmitting other control information).

In an aspect, a shadow-NZP-CSI-RS IE can be used to define logic chains. In 5G NR, a CSI-AperiodicTriggerStateList is based on a CSI report configuration (CSI-ReportConfig). The CSI-ReportConfig is based on a CSI resource configuration (CSI-ResourceConfig). The CSI-ResourceConfig contains a list of NZP-CSI-RS resource set elements (NZP-CSI-RS-ResourceSetList). As such, for predicted CCs, if no CSI-RS resource configuration is available, a UE cannot generate a CSI report. Accordingly, a shadow-NZP-CSI-RS-ResourceSetList information element may be provided for the CSI-ResourceConfig to be based upon. Also, a shadow-NZP-CSI-RS-ResourceConfigID may be provided for the CSI-ReportConfig to be based upon.

In an aspect, the "shadow" information elements are provided to define a resource set for a shadow-NZP-CSI-RS. Based on the resource set, the shadow-NZP-CSI-RS-ResourceConfig can be defined. Subsequently, the CSI-ReportConfig for the shadow-NZP-CSI-RS can be defined. Accordingly, a CSI report may be defined for predicted CCs when no reference signal (CSI-RS) is transmitted over the predicted CCs.

In an aspect, the CSI-AperiodicTriggerStateList is included in a RRC configuration message (and/or preconfigured at the UE). The reporting mechanism is pre-configured. Once configured, various approaches may be used to activate or deactivate the reporting mechanism (e.g., activate via downlink control information (DCI)). Reporting via a periodic, semi-persistent, or aperiodic basis may also pre-configured (e.g., via and additional information element in the RRC message).

In an aspect, mirrored component carriers (CCs) are provided. For example, two component carriers (e.g., CC1 and CC2) are mirrored if the resource configuration between CC1 and CC2 is mostly the same. As described above with respect to a shadow-NZP-CSI-RS, a predicted CC can be anywhere in the time-frequency domain with respect to a measured CC. However, in the case of mirrored CCs, the CC for which the UE is predicting the channel state information is specifically defined as the mirrored CC with respect to a measured CC. The mirrored CC is in the same location, or has the same resource configuration, as the measured CC. That is, although the predicted CC and the measured CC are different CCs, the time-frequency resource elements occupied by the CCs are mostly the same.

In an aspect, instead of defining a new CSI-RS resource configuration for generating/sending a CSI report for a mirrored CC, an existing CSI-RS resource configuration (CSI-ResourceConfig) may be modified by adding a field/information element to the configuration. Currently, the CSI-RS resource configuration includes a bandwidth part identification (BWP_ID) for the measured CC (BWP). Accordingly, a new information element (IE) may be added to the CSI-RS resource configuration for the mirrored CC (BWP). For example, a mirror_BWP_ID IE may be added. The new IE may further include a minor configuration adjustment. In an aspect, a new information element may also be added to a CSI report configuration (CSI-ReportConfig). For example, a BWP selector information element (indicating CC1, CC2, or CC1 and CC2) may be added. Also, an uplink (UL) resource allocation information element (in CC1, CC2, or CC1 and CC2) may be added to the CSI report configuration.

In a further aspect, the CSI resource configuration/CSI report configuration may further include information elements indicating resources for sending the CSI report to the gNB according to a periodic basis, a semi-persistent basis, or an aperiodic basis. In case of the semi-persistent basis or the aperiodic basis, if the CSI report is triggered by DCI in a CC, the UE may send the CSI report in the same CC.

Figure 8:
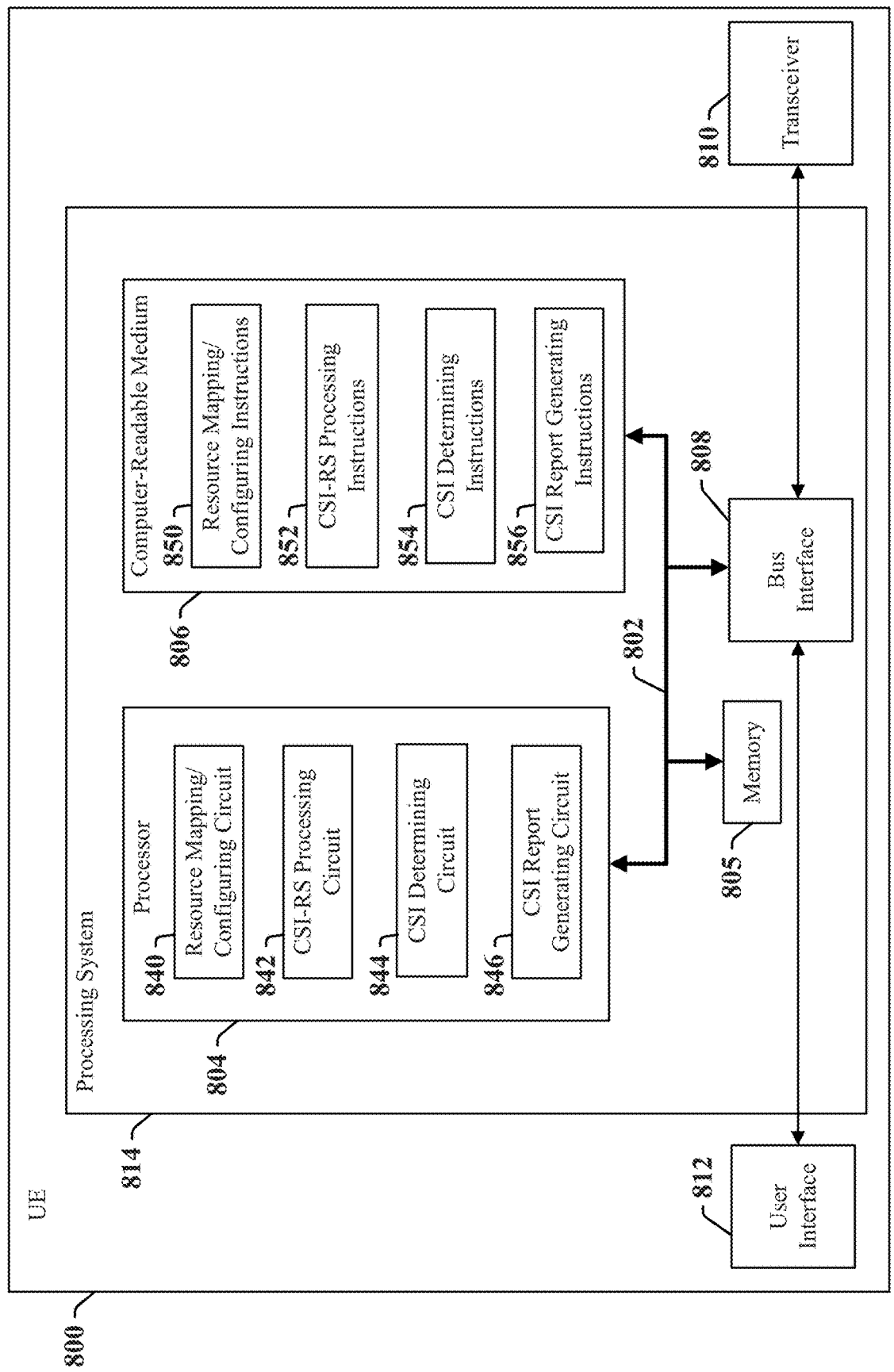
FIG. 8 is a block diagram illustrating an example of a hardware implementation for an exemplary UE employing a processing system according to some aspects of the present disclosure.

FIG. 8 is a block diagram illustrating an example of a hardware implementation for an exemplary UE 800 employing a processing system 814. For example, the UE 800 may be a user equipment (UE) as described in any one or more of FIGS. 1, 2, and/or 7.

The UE 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 800 may be configured to perform any one or more of the functions described herein. That is, the processor 804, as utilized in the UE 800, may be used to implement any one or more of the processes and procedures described below and illustrated in FIG. 9.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a communication interface or means for communicating with various other apparatus over a transmission medium. Depending upon the nature of the apparatus, a user interface 812 (e.g., keypad, display, speaker, microphone, joystick) may also be provided. Of course, such a user interface 812 is optional, and may be omitted in some examples, such as a base station.

In some aspects of the disclosure, the processor 804 may include resource mapping/configuring circuitry 840 configured for various functions, including, for example, determining a mapping between first time-frequency resources corresponding to a first component carrier and second time-frequency resources corresponding to a second component carrier using a prediction algorithm, sending the mapping to a base station, receiving a CSI-RS resource configuration from the base station, and receiving the prediction algorithm from the base station. For example, the resource mapping/configuring circuitry 840 may be configured to implement one or more of the functions described below in relation to FIG. 9, including, e.g., block 902. The processor 804 may also include CSI-RS processing circuitry 842 configured for various functions, including, for example, receiving, from a base station, a channel state information reference signal (CSI-RS) on the first time-frequency resources corresponding to the first component carrier. For example, the CSI-RS processing circuitry 842 may be configured to implement one or more of the functions described below in relation to FIG. 9, including, e.g., block 904. The processor 804 may also include CSI determining circuitry 844 configured for various functions, including, for example, measuring first channel state information (CSI) on the first time-frequency resources corresponding to the first component carrier based on the received CSI-RS, and predicting second CSI on the second time-frequency resources corresponding to the second component carrier based on the measured first CSI using the prediction algorithm. For example, the CSI determining circuitry 844 may be configured to implement one or more of the functions described below in relation to FIG. 9, including, e.g., blocks 906 and 908. The processor 804 may also include CSI report generating circuitry 846 configured for various functions, including, for example, generating a CSI report based on the predicted second CSI, and sending the CSI report to the base station. For example, the CSI report generating circuitry 846 may be configured to implement one or more of the functions described below in relation to FIG. 9, including, e.g., blocks 910, and 912.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 806 may include resource mapping/configuring instructions 850 configured for various functions, including, for example, determining a mapping between first time-frequency resources corresponding to a first component carrier and second time-frequency resources corresponding to a second component carrier using a prediction algorithm, sending the mapping to a base station, receiving a CSI-RS resource configuration from the base station, and receiving the prediction algorithm from the base station. For example, the resource mapping/configuring instructions 850 may be configured to implement one or more of the functions described below in relation to FIG. 9, including, e.g., block 902. The computer-readable storage medium 806 may also include CSI-RS processing instructions 852 configured for various functions, including, for example, receiving, from a base station, a channel state information reference signal (CSI-RS) on the first time-frequency resources corresponding to the first component carrier. For example, the CSI-RS processing instructions 852 may be configured to implement one or more of the functions described below in relation to FIG. 9, including, e.g., block 904. The computer-readable storage medium 806 may also include CSI determining instructions 854 configured for various functions, including, for example, measuring first channel state information (CSI) on the first time-frequency resources corresponding to the first component carrier based on the received CSI-RS, and predicting second CSI on the second time-frequency resources corresponding to the second component carrier based on the measured first CSI using the prediction algorithm. For example, the CSI determining instructions 854 may be configured to implement one or more of the functions described below in relation to FIG. 9, including, e.g., blocks 906 and 908. The computer-readable storage medium 806 may also include CSI report generating instructions 856 configured for various functions, including, for example, generating a CSI report based on the predicted second CSI, and sending the CSI report to the base station. For example, the CSI report generating instructions 856 may be configured to implement one or more of the functions described below in relation to FIG. 9, including, e.g., blocks 910, and 912.

Figure 9:
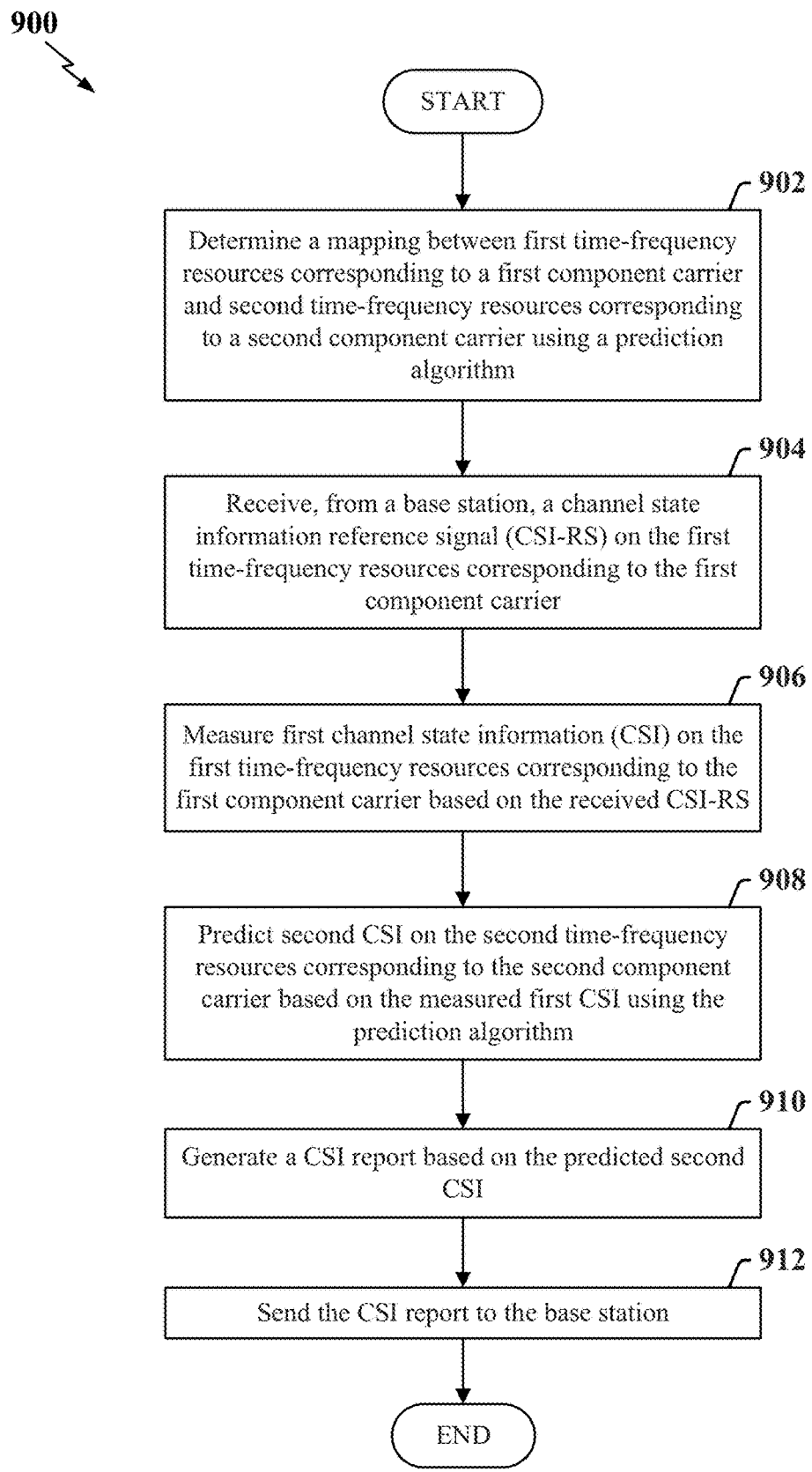
FIG. 9 is a flow chart illustrating an exemplary process for determining channel state information on a component carrier at a device according to some aspects of the present disclosure.

FIG. 9 is a flow chart illustrating an exemplary process 900 for determining channel state information on a component carrier at a device (e.g., UE). As described below, some or all illustrated features may be omitted in a particular implementation within the scope of the present disclosure, and some illustrated features may not be required for implementation of all aspects. In some examples, the process 900 may be carried out by the UE 800 illustrated in FIG. 8. In some examples, the process 900 may be carried out by any suitable apparatus or means for carrying out the functions or algorithm described below.

At block 902, the device determines a mapping between first time-frequency resources corresponding to a first component carrier (e.g., CC1) and second time-frequency resources corresponding to a second component carrier (e.g., CC2) using a prediction algorithm.

At block 904, the device receives, from the base station, a channel state information reference signal (CSI-RS) on the first time-frequency resources corresponding to the first component carrier.

At block 906, the device measures first channel state information (CSI) on the first time-frequency resources corresponding to the first component carrier based on the received CSI-RS.

At block 908, the device predicts second CSI on the second time-frequency resources corresponding to the second component carrier based on the measured first CSI using the prediction algorithm. In an aspect, no CSI-RS is transmitted on the second time-frequency resources corresponding to the second component carrier. In a further aspect, the second CSI is predicted further based on the mapping.

At block 910, the device generates a CSI report based on the predicted second CSI. At block 912, the device sends the CSI report to the base station. In an aspect, block 902 may include receiving a CSI-RS resource configuration from the base station. As such, the CSI report may be generated and sent based on the CSI-RS resource configuration. In an aspect, the CSI-RS resource configuration includes a shadow CSI-RS resource configuration (e.g., shadow-NZP-CSI-RS resource configuration) for the second time-frequency resources corresponding to the second component carrier. In a further aspect, the CSI-RS resource configuration includes a resource configuration for a mirrored bandwidth part (BWP) (e.g., mirror_BWP_ID IE) associated with the second time-frequency resources corresponding to the second component carrier.

In an aspect, the CSI report is generated and sent to the base station on a periodic basis, a semi-persistent basis, and/or an aperiodic basis. In a further aspect, the CSI report is sent on third time-frequency resources corresponding to the first component carrier, fourth time-frequency resources corresponding to the second component carrier, or both of the third time-frequency resources and the fourth time-frequency resources.

In an aspect, the prediction algorithm is known to the device. Accordingly, block 902 may further include sending the mapping to the base station, wherein the received CSI-RS resource configuration is a reconfigured CSI-RS resource configuration based on the mapping.

In an aspect, the prediction algorithm is known to the base station. Accordingly, block 902 may further include receiving the prediction algorithm from the base station, wherein the mapping is determined based on the received prediction algorithm, and wherein the received CSI-RS resource configuration is an initial CSI-RS resource configuration.

In one configuration, the UE 800 includes means for determining (e.g., resource mapping/configuring circuitry 840, memory 805, and/or transceiver 810) a mapping between first time-frequency resources corresponding to a first component carrier and second time-frequency resources corresponding to a second component carrier using a prediction algorithm, means for receiving (e.g., CSI-RS processing circuitry 842 and/or transceiver 810), from a base station, a channel state information reference signal (CSI-RS) on the first time-frequency resources corresponding to the first component carrier, means for measuring (e.g., CSI determining circuitry 844 and/or transceiver 810) first channel state information (CSI) on the first time-frequency resources corresponding to the first component carrier based on the received CSI-RS, means for predicting (e.g., CSI determining circuitry 844 and/or transceiver 810) second CSI on the second time-frequency resources corresponding to the second component carrier based on the measured first CSI using the prediction algorithm, means for generating a CSI report based on the predicted second CSI, means for sending (e.g., CSI report generating circuitry 846 and/or transceiver 810) the CSI report to the base station, means for receiving a CSI-RS resource configuration (e.g., resource mapping/configuring circuitry 840 and/or transceiver 810) from the base station, means for sending the mapping (e.g., resource mapping/configuring circuitry 840 and/or transceiver 810) to the base station, and means for receiving the prediction algorithm (e.g., resource mapping/configuring circuitry 840 and/or transceiver 810) from the base station. In one aspect, the aforementioned means may be the processor(s) 804 shown in FIG. 8 configured to perform the functions recited by the aforementioned means. In another aspect, the aforementioned means may be a circuit or any apparatus configured to perform the functions recited by the aforementioned means.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIGS. 1, 2, and/or 7, and utilizing, for example, the processes and/or algorithms described herein in relation to FIG. 9.

Figure 10:
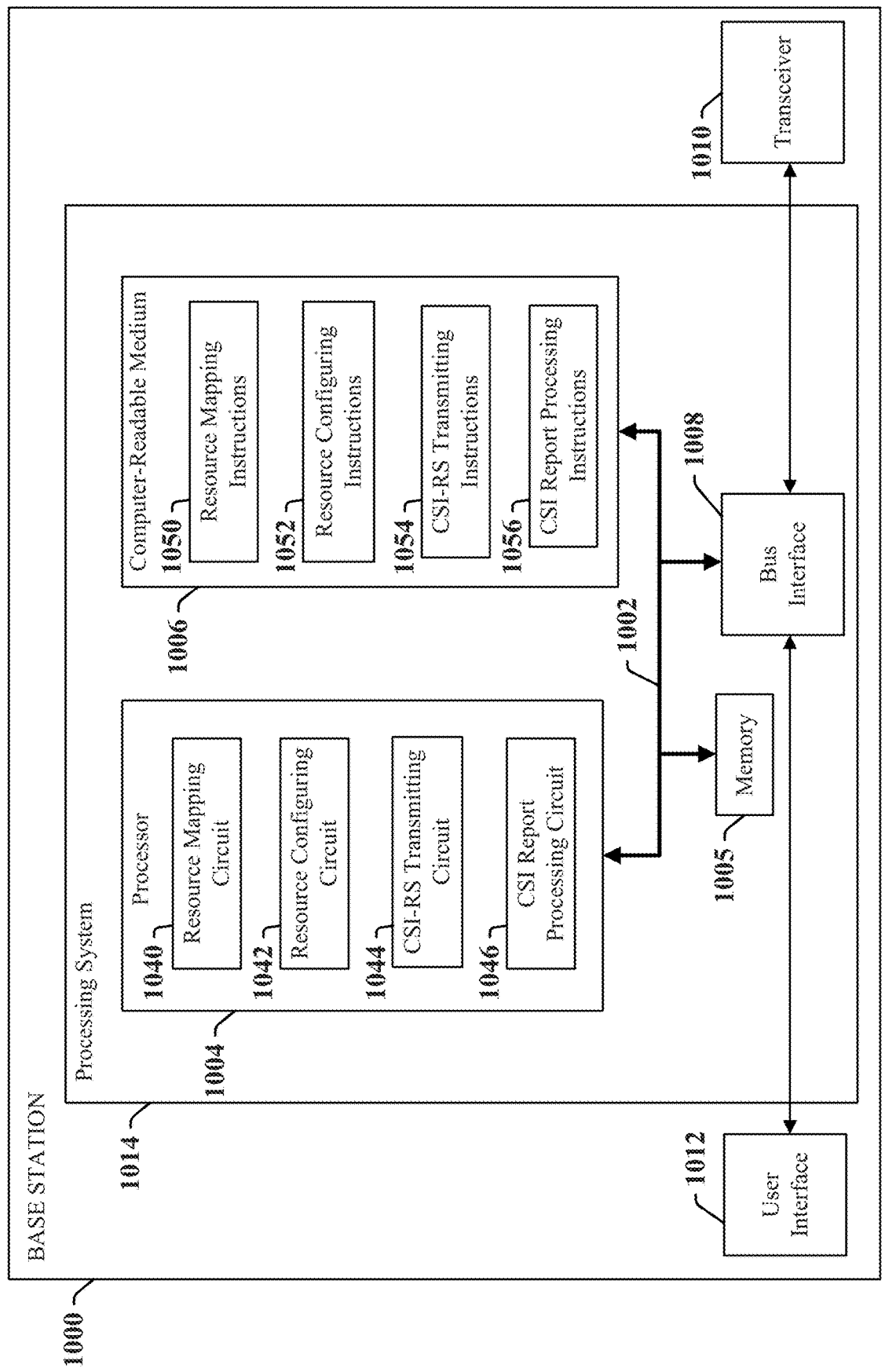
FIG. 10 is a conceptual diagram illustrating an example of a hardware implementation for an exemplary base station employing a processing system according to some aspects of the present disclosure.

FIG. 10 is a conceptual diagram illustrating an example of a hardware implementation for an exemplary base station 1000 employing a processing system 1014. In accordance with various aspects of the disclosure, an element, or any portion of an element, or any combination of elements may be implemented with a processing system 1014 that includes one or more processors 1004. For example, the base station 1000 may be a base station (e.g., gNB) as described in any one or more of FIGS. 1, 2, and/or 7.

The processing system 1014 may be substantially the same as the processing system 814 illustrated in FIG. 8, including a bus interface 1008, a bus 1002, memory 1005, a processor 1004, and a computer-readable medium 1006. Furthermore, the base station 1000 may include a user interface 1012 and a transceiver 1010 substantially similar to those described above in FIG. 8. That is, the processor 1004, as utilized in a base station 1000, may be used to implement any one or more of the processes described below and illustrated in FIG. 11.

In some aspects of the disclosure, the processor 1004 may include resource mapping circuitry 1040 configured for various functions, including, for example, determining a mapping between first time-frequency resources corresponding to a first component carrier and second time-frequency resources corresponding to a second component carrier, receiving the mapping from a device, and transmitting a prediction algorithm to the device. For example, the resource mapping circuitry 1040 may be configured to implement one or more of the functions described below in relation to FIG. 11, including, e.g., block 1102. The processor 1004 may also include resource configuring circuitry 1042 configured for various functions, including, for example, transmitting a CSI-RS resource configuration to a device. For example, the resource configuring circuitry 1042 may be configured to implement one or more of the functions described below in relation to FIG. 11, including, e.g., block 1104. The processor 1004 may also include CSI-RS transmitting circuitry 1044 configured for various functions, including, for example, transmitting, to the device, CSI-RS on the first time-frequency resources corresponding to the first component carrier. For example, the CSI-RS transmitting circuitry 1044 may be configured to implement one or more of the functions described below in relation to FIG. 11, including, e.g., block 1106. The processor 1004 may also include CSI report processing circuitry 1046 configured for various functions, including, for example, receiving, from the device, a channel state information (CSI) report including predicted CSI on the second time-frequency resources corresponding to the second component carrier, the predicted CSI based on the CSI-RS transmitted on the first time-frequency resources corresponding to the first component carrier. For example, the CSI report processing circuitry 1046 may be configured to implement one or more of the functions described below in relation to FIG. 11, including, e.g., block 1108.

In one or more examples, the computer-readable storage medium 1006 may include resource mapping instructions 1050 configured for various functions, including, for example, determining a mapping between first time-frequency resources corresponding to a first component carrier and second time-frequency resources corresponding to a second component carrier, receiving the mapping from a device, and transmitting a prediction algorithm to the device. For example, the resource mapping instructions 1050 may be configured to implement one or more of the functions described below in relation to FIG. 11, including, e.g., block 1102. The computer-readable storage medium 1006 may also include resource configuring instructions 1052 configured for various functions, including, for example, transmitting a CSI-RS resource configuration to a device. For example, the resource configuring instructions 1052 may be configured to implement one or more of the functions described below in relation to FIG. 11, including, e.g., block 1104. The computer-readable storage medium 1006 may also include CSI-RS transmitting instructions 1054 configured for various functions, including, for example, transmitting, to the device, CSI-RS on the first time-frequency resources corresponding to the first component carrier. For example, the CSI-RS transmitting instructions 1054 may be configured to implement one or more of the functions described below in relation to FIG. 11, including, e.g., block 1106. The computer-readable storage medium 1006 may also include CSI report processing instructions 1056 configured for various functions, including, for example, receiving, from the device, a channel state information (CSI) report including predicted CSI on the second time-frequency resources corresponding to the second component carrier, the predicted CSI based on the CSI-RS transmitted on the first time-frequency resources corresponding to the first component carrier. For example, the CSI report processing instructions 1056 may be configured to implement one or more of the functions described below in relation to FIG. 11, including, e.g., block 1108.

Figure 11:
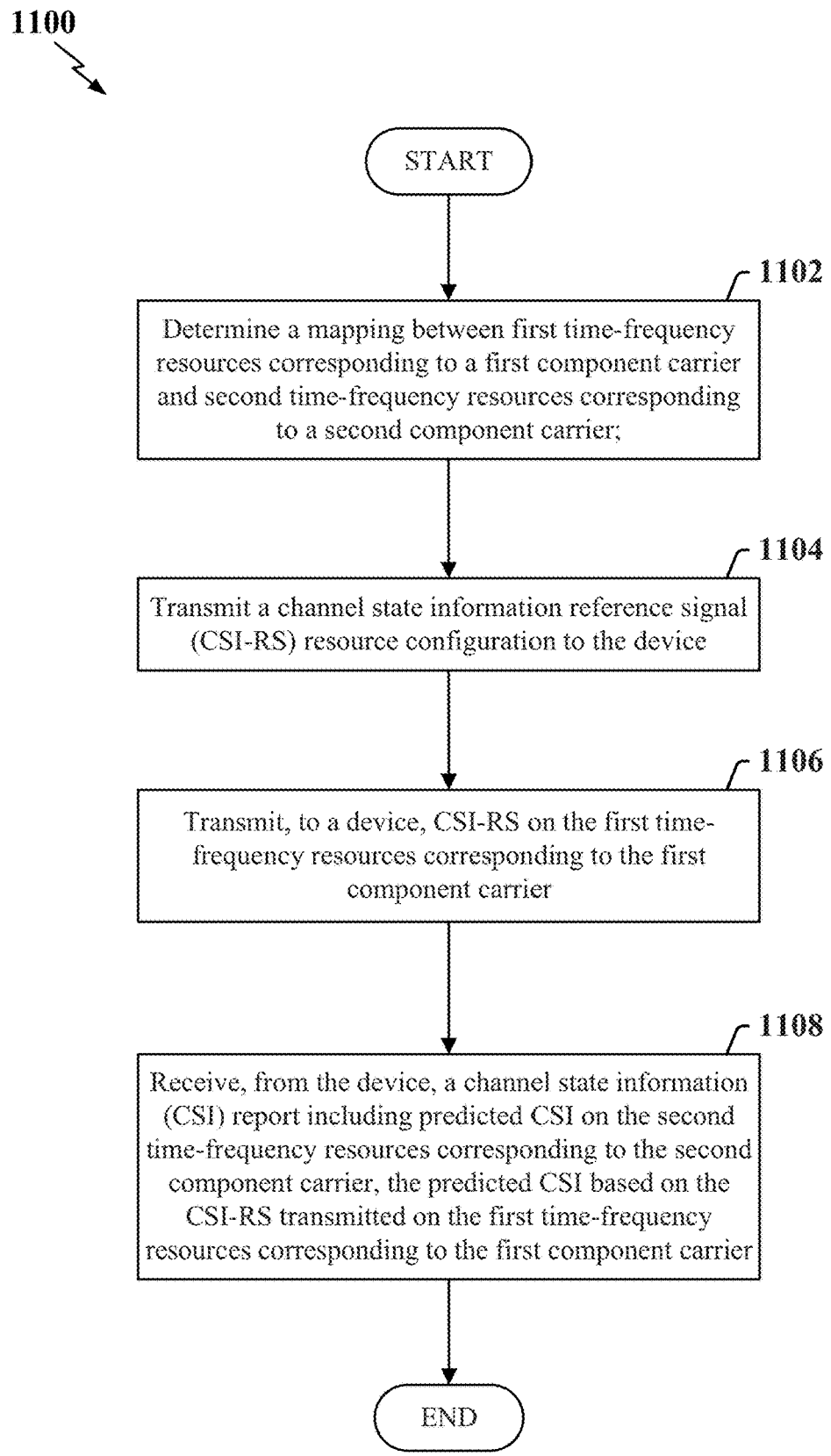
FIG. 11 is a flow chart illustrating an exemplary process for receiving channel state information of a component carrier at a base station according to some aspects of the present disclosure.

FIG. 11 is a flow chart illustrating an exemplary process 1100 for receiving channel state information of a component carrier at a base station. As described below, some or all illustrated features may be omitted in a particular implementation within the scope of the present disclosure, and some illustrated features may not be required for implementation of all aspects. In some examples, the process 1100 may be carried out by the base station 1000 illustrated in FIG. 10. In some examples, the process 1100 may be carried out by any suitable apparatus or means for carrying out the functions or algorithm described below.

At block 1102, the base station determines a mapping between first time-frequency resources corresponding to a first component carrier (e.g., CC1) and second time-frequency resources corresponding to a second component carrier (e.g., CC2).

At block 1104, the base station transmits a CSI-RS resource configuration to the device. In an aspect, the CSI-RS resource configuration includes a shadow CSI-RS resource configuration (e.g., shadow-NZP-CSI-RS resource configuration) for the second time-frequency resources corresponding to the second component carrier. In a further aspect, the CSI-RS resource configuration includes a resource configuration for a mirrored bandwidth part (BWP) (e.g., mirror_BWP_ID IE) associated with the second time-frequency resources corresponding to the second component carrier.

At block 1106, the base station transmits, to a device, a channel state information reference signal (CSI-RS) on the first time-frequency resources corresponding to the first component carrier.

At block 1108, the base station receives, from the device, a channel state information (CSI) report including predicted CSI on the second time-frequency resources corresponding to the second component carrier. The predicted CSI is based on the CSI-RS transmitted on the first time-frequency resources corresponding to the first component carrier. No CSI-RS is transmitted on the second time-frequency resources corresponding to the second component carrier. In an aspect, he CSI report is received based on the CSI-RS resource configuration.

In an aspect, block 1102 includes receiving the mapping from the device. Accordingly, the transmitted CSI-RS resource configuration is a reconfigured CSI-RS resource configuration based on the mapping.

In an aspect, the mapping is determined based on a prediction algorithm known to the base station. Accordingly, block 1102 may further include transmitting the prediction algorithm to the device, wherein the transmitted CSI-RS resource configuration is an initial CSI-RS resource configuration.

In an aspect, the CSI report is received from the device on a periodic basis, a semi-persistent basis, and/or an aperiodic basis. In a further aspect, the CSI report is received on third time-frequency resources corresponding to the first component carrier, fourth time-frequency resources corresponding to the second component carrier, or both of the third time-frequency resources and the fourth time-frequency resources.

In one configuration, the base station 1000 includes means for determining (e.g., resource mapping circuitry 1040, memory 1005, and/or transceiver 1010) a mapping between first time-frequency resources corresponding to a first component carrier and second time-frequency resources corresponding to a second component carrier, means for transmitting (e.g., CSI-RS transmitting circuitry 1042 and/or transceiver 1010), to a device, a channel state information reference signal (CSI-RS) on the first time-frequency resources corresponding to the first component carrier, means for receiving (e.g., CSI report processing circuitry 1046 and/or transceiver 1010), from the device, a channel state information (CSI) report including predicted CSI on the second time-frequency resources corresponding to the second component carrier, the predicted CSI based on the CSI-RS transmitted on the first time-frequency resources corresponding to the first component carrier, means for transmitting a CSI-RS resource configuration (e.g., resource configuring circuitry 1042 and/or transceiver 1010) to the device, means for receiving the mapping (e.g., resource mapping circuitry 1040 and/or transceiver 1010) from the device, and means for transmitting a prediction algorithm (e.g., resource mapping circuitry 1040 and/or transceiver 1010) to the device. In one aspect, the aforementioned means may be the processor(s) 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1, 2, and/or 7, and utilizing, for example, the processes and/or algorithms described herein in relation to FIG. 11.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The following provides an overview of aspects of the present disclosure:

Aspect 1: A method of determining channel state information on a component carrier at a device, comprising: determining a mapping between first time-frequency resources corresponding to a first component carrier and second time-frequency resources corresponding to a second component carrier using a prediction algorithm; receiving, from a base station, a channel state information reference signal (CSI-RS) on the first time-frequency resources corresponding to the first component carrier; measuring first channel state information (CSI) on the first time-frequency resources corresponding to the first component carrier based on the received CSI-RS; predicting second CSI on the second time-frequency resources corresponding to the second component carrier based on the measured first CSI using the prediction algorithm; generating a CSI report based on the predicted second CSI; and sending the CSI report to the base station.

Aspect 2: The method of aspect 1, wherein no CSI-RS is transmitted on the second time-frequency resources corresponding to the second component carrier.

Aspect 3: The method of aspect 1 or 2, further comprising: receiving, from the base station, a CSI-RS resource configuration, wherein the CSI report is generated and sent based on the CSI-RS resource configuration, and wherein the second CSI is predicted further based on the mapping.

Aspect 4: The method of any one of aspects 1 through 3, wherein the prediction algorithm is known to the device, and determining the mapping comprises: sending the mapping to the base station, wherein the received CSI-RS resource configuration is a reconfigured CSI-RS resource configuration based on the mapping.

Aspect 5: The method of any one of aspects 1 through 3, wherein the prediction algorithm is known to the base station, and determining the mapping comprises: receiving the prediction algorithm from the base station, wherein the mapping is determined based on the received prediction algorithm, and wherein the received CSI-RS resource configuration is an initial CSI-RS resource configuration.

Aspect 6: The method of any one of aspects 1 through 5, wherein the CSI-RS resource configuration includes a shadow CSI-RS resource configuration for the second time-frequency resources corresponding to the second component carrier.

Aspect 7: The method of any one of aspects 1 through 5, wherein the CSI-RS resource configuration includes a resource configuration for a mirrored bandwidth part (BWP) associated with the second time-frequency resources corresponding to the second component carrier.

Aspect 8: The method of any one of aspects 1 through 7, wherein the CSI report is generated and sent to the base station on at least one of: a periodic basis; a semi-persistent basis; or an aperiodic basis.

Aspect 9: The method of claim any one of aspects 1 through 8, wherein the CSI report is sent via: third time-frequency resources corresponding to the first component carrier; fourth time-frequency resources corresponding to the second component carrier; or both of the third time-frequency resources and the fourth time-frequency resources.

Aspect 10: A device comprising at least one processor, and a memory coupled to the at least one processor, the at least one processor and the memory configured to perform a method of any one of aspects 1 through 9.

Aspect 11: A device comprising at least one means for performing a method of any one of aspects 1 through 9.

Aspect 12: A non-transitory computer-readable medium storing code at a device, the code comprising instructions executable by a processor to perform a method of any one of aspects 1 through 9.

Aspect 13: A method of receiving channel state information of a component carrier at a base station, comprising: determining a mapping between first time-frequency resources corresponding to a first component carrier and second time-frequency resources corresponding to a second component carrier; transmitting, to a device, a channel state information reference signal (CSI-RS) on the first time-frequency resources corresponding to the first component carrier; and receiving, from the device, a channel state information (CSI) report including predicted CSI on the second time-frequency resources corresponding to the second component carrier, the predicted CSI based on the CSI-RS transmitted on the first time-frequency resources corresponding to the first component carrier.

Aspect 14: The method of aspect 13, wherein no CSI-RS is transmitted on the second time-frequency resources corresponding to the second component carrier.

Aspect 15: The method of aspect 13 or 14, further comprising: transmitting a CSI-RS resource configuration to the device, wherein the CSI report is received based on the CSI-RS resource configuration.

Aspect 16: The method of any one of aspects 13 through 15, wherein the determining the mapping comprises: receiving the mapping from the device, wherein the transmitted CSI-RS resource configuration is a reconfigured CSI-RS resource configuration based on the mapping.

Aspect 17: The method of any one of aspects 13 through 15, wherein the determining the mapping comprises: determining the mapping based on a prediction algorithm known to the base station; and transmitting the prediction algorithm to the device, wherein the transmitted CSI-RS resource configuration is an initial CSI-RS resource configuration.

Aspect 18: The method of any one of aspects 13 through 17, wherein the CSI-RS resource configuration includes a shadow CSI-RS resource configuration for the second time-frequency resources corresponding to the second component carrier.

Aspect 19: The method of any one of aspects 13 through 17, wherein the CSI-RS resource configuration includes a resource configuration for a mirrored bandwidth part (BWP) associated with the second time-frequency resources corresponding to the second component carrier.

Aspect 20: The method of any one of aspects 13 through 19, wherein the CSI report is received from the device on at least one of: a periodic basis; a semi-persistent basis; or an aperiodic basis.

Aspect 21: The method of any one of aspects 13 through 20, wherein the CSI report is received via: third time-frequency resources corresponding to the first component carrier; fourth time-frequency resources corresponding to the second component carrier; or both of the third time-frequency resources and the fourth time-frequency resources.

Aspect 22: A base station comprising at least one processor, and a memory coupled to the at least one processor, the at least one processor and the memory configured to perform a method of any one of aspects 13 through 21.

Aspect 23: A base station comprising at least one means for performing a method of any one of aspects 13 through 21.

Aspect 24: A non-transitory computer-readable medium storing code at a base station, the code comprising instructions executable by a processor to perform a method of any one of aspects 13 through 21.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of determining channel state information on a component carrier at a device, comprising:
receiving, from a base station, a channel state information reference signal (CSI-RS) report configuration;
determining a mapping between first time-frequency resources corresponding to a first component carrier and second time-frequency resources corresponding to a second component carrier using a prediction algorithm;

receiving, from the base station, a channel state information reference signal (CSI-RS) on the first time-frequency resources corresponding to the first component carrier;

measuring first channel state information (CSI) on the first time-frequency resources corresponding to the first component carrier based on the received CSI-RS;

predicting second CSI on the second time-frequency resources corresponding to the second component carrier based on the measured first CSI using the prediction algorithm and further based on the mapping;

generating a CSI report based on the predicted second CSI; and sending the CSI report to the base station, wherein the CSI report is generated and sent based on the CSI-RS report configuration.

2. The method of claim 1, wherein no CSI-RS is transmitted on the second time-frequency resources corresponding to the second component carrier and the second time-frequency resources are configured to carry a data transmission on a physical downlink shared channel (PDSCH).

3. The method of claim 1,
wherein the receiving CSI-RS report configuration includes receiving a CSI-RS resource configuration.

4. The method of claim 3, wherein the prediction algorithm is known to the device, and determining the mapping comprises:
sending the mapping to the base station,
wherein the received CSI-RS resource configuration is a reconfigured CSI-RS resource configuration based on the mapping.

5. The method of claim 3, wherein the prediction algorithm is known to the base station, and determining the mapping comprises:
receiving the prediction algorithm from the base station,
wherein the mapping is determined based on the received prediction algorithm, and
wherein the received CSI-RS resource configuration is an initial CSI-RS resource configuration.

6. The method of claim 3, wherein the CSI-RS resource configuration includes a shadow CSI-RS resource configuration for the second time-frequency resources corresponding to the second component carrier, and wherein the second time-frequency resources are configured to carry a data transmission on a physical downlink shared channel (PDSCH).

7. The method of claim 3, wherein the CSI-RS resource configuration includes a resource configuration for a mirrored bandwidth part (BWP) associated with the second time-frequency resources corresponding to the second component carrier.

8. The method of claim 1, wherein the CSI report is generated and sent to the base station on at least one of:
a periodic basis;
a semi-persistent basis; or
an aperiodic basis.

9. The method of claim 1, wherein the CSI report is sent via:
third time-frequency resources corresponding to the first component carrier;
fourth time-frequency resources corresponding to the second component carrier; or
both of the third time-frequency resources and the fourth time-frequency resources.

10. A device for determining channel state information on a component carrier, comprising:
at least one processor;
a transceiver communicatively coupled to the at least one processor; and
a memory communicatively coupled to the at least one processor, wherein the at least one processor is configured to:
determine a mapping between first time-frequency resources corresponding to a first component carrier and second time-frequency resources corresponding to a second component carrier using a prediction algorithm,
receive, from a base station, a channel state information reference signal (CSI-RS) report configuration,
receive, from the base station, a channel state information reference signal (CSI-RS) on the first time-frequency resources corresponding to the first component carrier,
measure first channel state information (CSI) on the first time-frequency resources corresponding to the first component carrier based on the received CSI-RS,
predict second CSI on the second time-frequency resources corresponding to the second component carrier based on the measured first CSI using the prediction algorithm and further based on the mapping,
generate a CSI report based on the predicted second CSI, and
send the CSI report to the base station,
wherein the CSI report is generated and sent based on the CSI-RS report configuration.

11. The device of claim 10,
wherein the at least one processor configured to receive the CSI-RS report configuration is further configured to receive a CSI-RS resource configuration.

12. The device of claim 11, wherein the prediction algorithm is known to the device, and the at least one processor is further configured to:
send the mapping to the base station,
wherein the received CSI-RS resource configuration is a reconfigured CSI-RS resource configuration based on the mapping.

13. The device of claim 11, wherein the prediction algorithm is known to the base station, and the at least one processor is further configured to:
receive the prediction algorithm from the base station,
wherein the mapping is determined based on the received prediction algorithm, and
wherein the received CSI-RS resource configuration is an initial CSI-RS resource configuration.

14. The device of claim 11, wherein the CSI-RS resource configuration includes:
a shadow CSI-RS resource configuration for the second time-frequency resources corresponding to the second component carrier; or
a resource configuration for a mirrored bandwidth part (BWP) associated with the second time-frequency resources corresponding to the second component carrier.

15. The device of claim 10, wherein:
the CSI report is generated and sent to the base station on at least one of a periodic basis, a semi-persistent basis, or an aperiodic basis; and the CSI report is sent via:
- third time-frequency resources corresponding to the first component carrier,
- fourth time-frequency resources corresponding to the second component carrier, or
- both of the third time-frequency resources and the fourth time-frequency resources.

16. A method of receiving channel state information of a component carrier at a base station, comprising:
- determining a mapping between first time-frequency resources corresponding to a first component carrier and second time-frequency resources corresponding to a second component carrier, wherein the determining the mapping comprises receiving the mapping from a device;
- transmitting a channel state information reference signal (CSI-RS) report configuration to the device;
- transmitting, to the device, a channel state information reference signal (CSI-RS) on the first time-frequency resources corresponding to the first component carrier; and
- receiving, from the device, a channel state information (CSI) report including predicted CSI on the second time-frequency resources corresponding to the second component carrier, the predicted CSI based on the CSI-RS transmitted on the first time-frequency resources corresponding to the first component carrier, wherein the CSI report is received based on the CSI-RS report configuration.

17. The method of claim 16, wherein no CSI-RS is transmitted on the second time-frequency resources corresponding to the second component carrier and the second time-frequency resources are configured to carry a data transmission on a physical downlink shared channel (PDSCH).

18. The method of claim 16,
wherein the transmitting the CSI-RS report configuration includes transmitting a CSI-RS resource configuration.

19. The method of claim 18,
wherein the transmitted CSI-RS resource configuration is a reconfigured CSI-RS resource configuration based on the mapping.

20. The method of claim 18, wherein the determining the mapping comprises:
- determining the mapping based on a prediction algorithm known to the base station; and
- transmitting the prediction algorithm to the device,
wherein the transmitted CSI-RS resource configuration is an initial CSI-RS resource configuration if the mapping is determined based on the prediction algorithm.

21. The method of claim 18, wherein the CSI-RS resource configuration includes a shadow CSI-RS resource configuration for the second time-frequency resources corresponding to the second component carrier, and wherein the second time-frequency resources are configured to carry a data transmission on a physical downlink shared channel (PDSCH).

22. The method of claim 18, wherein the CSI-RS resource configuration includes a resource configuration for a mirrored bandwidth part (BWP) associated with the second time-frequency resources corresponding to the second component carrier.

23. The method of claim 16, wherein the CSI report is received from the device on at least one of:
- a periodic basis;
- a semi-persistent basis; or
- an aperiodic basis.

24. The method of claim 16, wherein the CSI report is received via:
- third time-frequency resources corresponding to the first component carrier;
- fourth time-frequency resources corresponding to the second component carrier; or
- both of the third time-frequency resources and the fourth time-frequency resources.

25. A base station for receiving channel state information of a component carrier, comprising:
- at least one processor;
- a transceiver communicatively coupled to the at least one processor; and
- a memory communicatively coupled to the at least one processor, wherein the at least one processor is configured to:
  - determine a mapping between first time-frequency resources corresponding to a first component carrier and second time-frequency resources corresponding to a second component carrier, wherein the at least one processor is configured to receive the mapping from a device,
  - transmit a channel state information reference signal (CSI-RS) report configuration to the device;
  - transmit, to the device, a channel state information reference signal (CSI-RS) on the first time-frequency resources corresponding to the first component carrier, and
  - receive, from the device, a channel state information (CSI) report including predicted CSI on the second time-frequency resources corresponding to the second component carrier, the predicted CSI based on the CSI-RS transmitted on the first time-frequency resources corresponding to the first component carrier, wherein the CSI report is received based on the CSI-RS report configuration.

26. The base station of claim 25,
wherein the at least one processor configured to transmit the CSI-RS report configuration is further configured to transmit a CSI-RS resource configuration.

27. The base station of claim 26,
wherein the transmitted CSI-RS resource configuration is a reconfigured CSI-RS resource configuration based on the mapping.

28. The base station of claim 26, wherein the at least one processor is further configured to:
- determine the mapping based on a prediction algorithm known to the base station; and
- transmit the prediction algorithm to the device,
wherein the transmitted CSI-RS resource configuration is an initial CSI-RS resource configuration if the mapping is determined based on the prediction algorithm.

29. The base station of claim 26, wherein the CSI-RS resource configuration includes:
- a shadow CSI-RS resource configuration for the second time-frequency resources corresponding to the second component carrier; or
- a resource configuration for a mirrored bandwidth part (BWP) associated with the second time-frequency resources corresponding to the second component carrier.

30. The base station of claim 25, wherein:
the CSI report is received from the device on at least one of a periodic basis, a semi-persistent basis, or an aperiodic basis; and the CSI report is received via:
   third time-frequency resources corresponding to the first component carrier,
   fourth time-frequency resources corresponding to the second component carrier, or
   both of the third time-frequency resources and the fourth time-frequency resources.

\* \* \* \* \*